(12) United States Patent
Denenberg et al.

(10) Patent No.: US 7,167,706 B2
(45) Date of Patent: Jan. 23, 2007

(54) METHOD FOR REGISTERING WITH A COMMUNICATION SERVICE

(75) Inventors: Jack Denenberg, Longwood, FL (US); Denise Febo, Everett, WA (US)

(73) Assignee: Cingular Wireless II, LLC., Atlanta, GA (US)

( * ) Notice: Subject to any disclaimer, the term of this patent is extended or adjusted under 35 U.S.C. 154(b) by 0 days.

(21) Appl. No.: 10/890,298

(22) Filed: Jul. 14, 2004

(65) Prior Publication Data

US 2004/0248570 A1 Dec. 9, 2004

Related U.S. Application Data

(63) Continuation of application No. 09/306,761, filed on May 7, 1999, now Pat. No. 6,859,649.

(51) Int. Cl.
*H04Q 7/20* (2006.01)

(52) U.S. Cl. .............................. 455/432.1; 455/435.1; 455/407; 455/432.3

(58) Field of Classification Search ............ 455/435.1, 455/432, 406, 407, 422.1, 550.1, 432.3, 456.3, 455/432.1
See application file for complete search history.

(56) References Cited

U.S. PATENT DOCUMENTS

| | | | |
|---|---|---|---|
| 5,428,666 A * | 6/1995 | Fyfe et al. ................ | 455/432.1 |
| 5,629,975 A | 5/1997 | Tiedemann, Jr. et al. ..... | 379/60 |
| 5,774,802 A * | 6/1998 | Tell et al. .................... | 455/406 |
| 5,862,480 A | 1/1999 | Wild et al. | |
| 5,918,172 A | 6/1999 | Saunders et al. ........... | 455/414 |
| 5,940,589 A | 8/1999 | Donovan et al. ........... | 395/186 |
| 5,946,614 A * | 8/1999 | Robbins et al. ............. | 455/407 |
| 6,018,652 A | 1/2000 | Frager et al. ............... | 455/406 |
| 6,097,950 A * | 8/2000 | Bertacchi .................. | 455/432.2 |
| 6,108,540 A * | 8/2000 | Sonti et al. ................. | 455/433 |
| 6,304,753 B1 | 10/2001 | Hartmaier .................... | 455/414 |
| 6,400,940 B1 | 6/2002 | Sennett ....................... | 455/414 |
| 6,405,033 B1 * | 6/2002 | Kennedy et al. ......... | 455/422.1 |
| 6,577,858 B1 * | 6/2003 | Gell ........................... | 455/407 |
| 6,615,041 B2 * | 9/2003 | Adamany et al. ........ | 455/432.1 |
| 2002/0086671 A1* | 7/2002 | Amin et al. ............. | 455/435.1 |

FOREIGN PATENT DOCUMENTS

| | | |
|---|---|---|
| EP | 0 685 972 | 12/1995 |
| WO | WO 96/24226 | 8/1996 |
| WO | WO 97/34438 | 9/1997 |

* cited by examiner

*Primary Examiner*—Lana Le
(74) *Attorney, Agent, or Firm*—Kenyon & Kenyon LLP

(57) ABSTRACT

A method determines whether a given mobile communication device is eligible to register for a particular service. A first database tracks the equipment capabilities of various mobile devices. A second database tracks which regions, of a plurality, of geographic regions are eligible to receive the service. These databases are checked when the system receives a request to register for the service.

10 Claims, 5 Drawing Sheets

| 3831 | 3832 | 3833 | 3834 | | 3835 | 3836 | 383 |
|------|------|-------|---------|------|-------------|------|-----|
| ESN  | MAKE | MODEL | BROWSER |      | OAA CAPABLE | MNP  | ..... |
| XXXXX | YYYY | ZZZ | YES | TYPE | YES | YES | |
| | | | | | | | |

| | 4821 | 4822 | 482 4823 | |
|---|---|---|---|---|
| | LOCATION IDENTIFIER | RATE PLAN 1 | RATE PLAN 2 | ..... |
| | 20005 | Y | Y | |
| | 28100 | N | Y | |
| | . | . | . | |

FIG. 4A

| 4831 | 4832 | 482a 4833 |
|---|---|---|
| LOCATION IDENTIFIER | LOCATION CAPABILITY | RATE PLAN |
| 20005 | OREA | DOR (1OR) |
| 28100 | CDPD | POCKET NET |

FIG. 4B

METHOD FOR REGISTERING WITH A COMMUNICATION SERVICE

This is a continuation of application Ser. No. 09/306,761 filed 7 May 1999 now U.S. Pat. No. 6,859,649, the content of which is incorporated herein by reference in its entirety.

FIELD OF THE INVENTION

The present invention relates to a method for registering with a communication service. More particularly, the present invention is directed to a method for registering a wireless communication device with a given service based on the equipment capabilities of the device and the home location of the device.

BACKGROUND OF THE INVENTION

More and more options are available for communicating information between parties. A plurality of communication media exist. Of course, there is traditional wireline communication, available over telephone networks. Additionally, newer technologies provide enhanced capability for communications, e.g., wireless communication capabilities enable mobile communications and optical fiber capabilities provide increased transmission throughput. At the same time that the number of communication media has grown, the number of different types of services available on each media has also grown. It has been common for various transmission techniques to be adapted to customers' needs and to offer new techniques for exchanging information along the networks. In addition to offering new services, new billing schemes have also been proposed both to encourage the use of various communication media, and in the name of competition between providers of similar types of services.

One area in which there has been a continued amount of growth has been in the wireless communication area. Wireless communication has enabled parties to have mobility and still maintain a link to a communications system whereby they can be easily contacted by others or can easily initiate contact with others. These mobile communication networks have found greater favor in our ever-increasingly mobile society where business requirements demand that people who are communicating be accessible wherever they may be. These networks provide voice communication, data communication and messaging capabilities, for example.

Mobile communication systems rely on wireless communications between a mobile communications device, such as a wireless telephone or data set, and one or more of a plurality of radio base stations which typically form the transceivers for respective cell sites. These base stations communicate with mobile devices over the airwaves using a plurality of different types of protocols. A given wireless service provider may have multiple base stations within a given geographic region, thereby creating a wireless service footprint for that provider in that geographic region. The base stations are tied by wireline communications to a switching center, often referred to as a mobile switching center (MSC), which provides a gateway to a wireline telephone network such as the public switched telephone network (PSTN). In the wireless communication environment, the holder of a wireless communication device can initiate a communication by initiating an over-the-air message to a base station that serves the cell site in which the wireless device is presently located. The base station then operates through the MSC and the PSTN to establish the appropriate process for a call set up to the intended destination of the communication. The intended destination could be a wireline phone or data mode or another wireless apparatus. That second wireless apparatus could reside in the same wireless area as the initiating party, it could be in a different geographic location but serviced by the same wireless service provider as that servicing the initial party, or it could be located in a different geographic region that is serviced by a different wireless service provider.

A block diagram of a known arrangement of a wireless communication system interacting with a wireline communication system is illustrated in FIG. 1. In this arrangement, three wireless communication service regions, 110, 120 and 130 are each shown coupled to a different local exchange carrier (LEC) within a PSTN 150. These three wireless services regions could be geographically disparate. For example, region 110 could be in the New York City area, region 120 could be in the Boston area, and region 130 could be in the Chicago area. Furthermore, the service providers for the respective regions can be different. For example, service provider A could service region 110, service provider B could service region 120, and service provider C could service region 130. For purposes of describing a particular series of services of interest below, however, it will be assumed that the service provider for regions 120 and 130 is the same. Each of the wireless service regions includes at least one MSC (114, 124, or 134) and one or more base stations (e.g., 111, 112, 121, 122, 131, 132). Only one mobile communication device, 125, is shown in the drawing figure although it should be understood that many wireless devices may be active in each of the regions at the same time. The PSTN can be thought of as being constituted by a plurality of LECs, for example, 151 to 154. These LECs may be interconnected with one another via one or more inter-exchange carriers (IXC) such as 155, 156 and 157. The couplings shown in the drawing figure are representative of samples of connections that might be made. Typically, the PSTN includes a multitude of LECs and IXCs with various connections capable between them so as to establish connectivity between one LEC and another. The LECs at either end of a particular call set up can be associated with different companies, for example, different Regional Bell Operating Companies (RBOCs). Similarly, different inter-exchange carriers (for example AT&T) can provide connectivity between the respective LECs.

Thus, in one example of a wireless communication it would be possible for a party at telephone 101 to initiate a telephone call to the mobile device 125. The call set up would be performed on a signaling network known as signaling system 7 (SS7) which is not shown in the present drawings. This signaling network allows for control signals to be sent for establishing the call set-up without taking up communication bandwidth along the connection between 101 and mobile device 125. A call would then be set up from LEC 152 to LEC 154 via inter-exchange carrier 157. Since the call is directed to a mobile device, once it is determined that the mobile device is in region 120 via well known mobile device tracking techniques, a call set up would continue to MSC 124 which in turn would establish a connection to base station 121. Finally, over-the-air contact would be made with mobile device 125 if it is on and registered with base station 121. Similarly, a connection can be established from mobile station 125 to telephone 101 or 102 utilizing similar technology and the same control channels for call set-up.

It is also known in the art to use a technique known as over-the-air activation (OAA) to "turn-on" a mobile phone for a particular service provider. In particular, if a phone is purchased or leased from a given wireless service provider, then the phone must be registered with the wireless service provider so it knows who the subscriber is for billing purposes and so it can capture the subscriber's preferences for such things as long distance service provider and the type of rate schedule which should be applied to the subscriber. Typically, when the phone is leased or purchased a wireline communication is established via the PSTN to a wireless services administrative center such as that shown as 180 in FIG. 1. Alternatively, a registration operation could be initiated via a data connection over a wide area network such as the Internet. A representative for the wireless service provider initiates a registration sequence in which information is received about the wireless device in question and about the wireless services for which the user is subscribing. The administrative center, having completed the gathering of information for registration can then initiate an over-the-air activation process by which roaming schedules and information about network accessibility can be transmitted to the device in question over-the-air. For example, the over-the-air information can include information for an intelligent roaming database. This information can then be stored in memory in the wireless communication device for later use in establishing communications, whether those communications occur with the wireless device within the wireless service provider's footprint or within the footprint of another provider with whom the initial provider has some "roaming" agreement. For example, if mobile device is moved to region 110, which is serviced by a different provider, it is considered to be roaming. It will be permitted access only if the service providers of regions 110 and 120 have entered into a roaming agreement. Such an agreement may require that the home provider pay a fee for the right of its subscribers to roam.

While the above arrangement is known in the art, these arrangements are somewhat limited to the degree that they facilitate registering a given mobile device or subscriber to a new service, particularly where access to that service needs to be or ought to be limited based on certain parameters associated with the device. An arrangement which takes into account this need would be beneficial.

SUMMARY OF THE INVENTION

The present invention is directed to a method and an arrangement that facilitate registration for one or more new services in the wireless communication field. In accordance with an embodiment of the present invention one or more databases are maintained by the wireless service provider so as to keep track of the equipment capabilities of a given mobile communication device, as well as the general home location of such a device. These equipment capability and location information parameters can be used to create a filter for various services which can be offered by the wireless service provider. Thus, when a subscriber intends to register for a given service, the wireless service provider can determine whether the equipment used by the potential subscriber is capable of operating to perform the desired service with reference to an equipment capabilities database. In addition, it is important that the wireless service provider be certain that the frequent location of the device be such that the service can be economically administered to a subscriber, so, an area eligibility database may be maintained as well. These two databases are examined when any given mobile device desires to register for a given service or program. The equipment capabilities with respect to the device and location capabilities with respect to the potential subscriber are then utilized to determine the potential subscriber's eligibility for registration to one or more services.

One type of service for which this may be most beneficial is a special billing service which provides certain communication capabilities at a fixed price where the price is set in accordance with a pre-determined evaluation of network usage.

BRIEF DESCRIPTION OF THE DRAWINGS

FIGS. 4A and 4B illustrate, in block diagram form, arrangements of another component of FIG. 2.

DETAILED DESCRIPTION

The present invention provides a method by which a subscriber having a wireless communication device can be registered to one or more wireless services provided by a given wireless service provider. In accordance with the present invention, a wireless services administrative center for the wireless service provider in question, maintains information about the device capabilities of each of the devices registered with that wireless service provider, that is, each of the subscribers to that given wireless service provider. In addition, the wireless services administrative center maintains an eligibility area database. The eligibility area database is patterned after the footprint of the wireless service provider. In this circumstance, the eligibility area database contains information identifying those locations or areas which are serviced by the wireless service provider without having to provide some sort of roaming arrangement. Thus, the system database includes information about the overall footprint of the wireless service provider.

Figure 1:
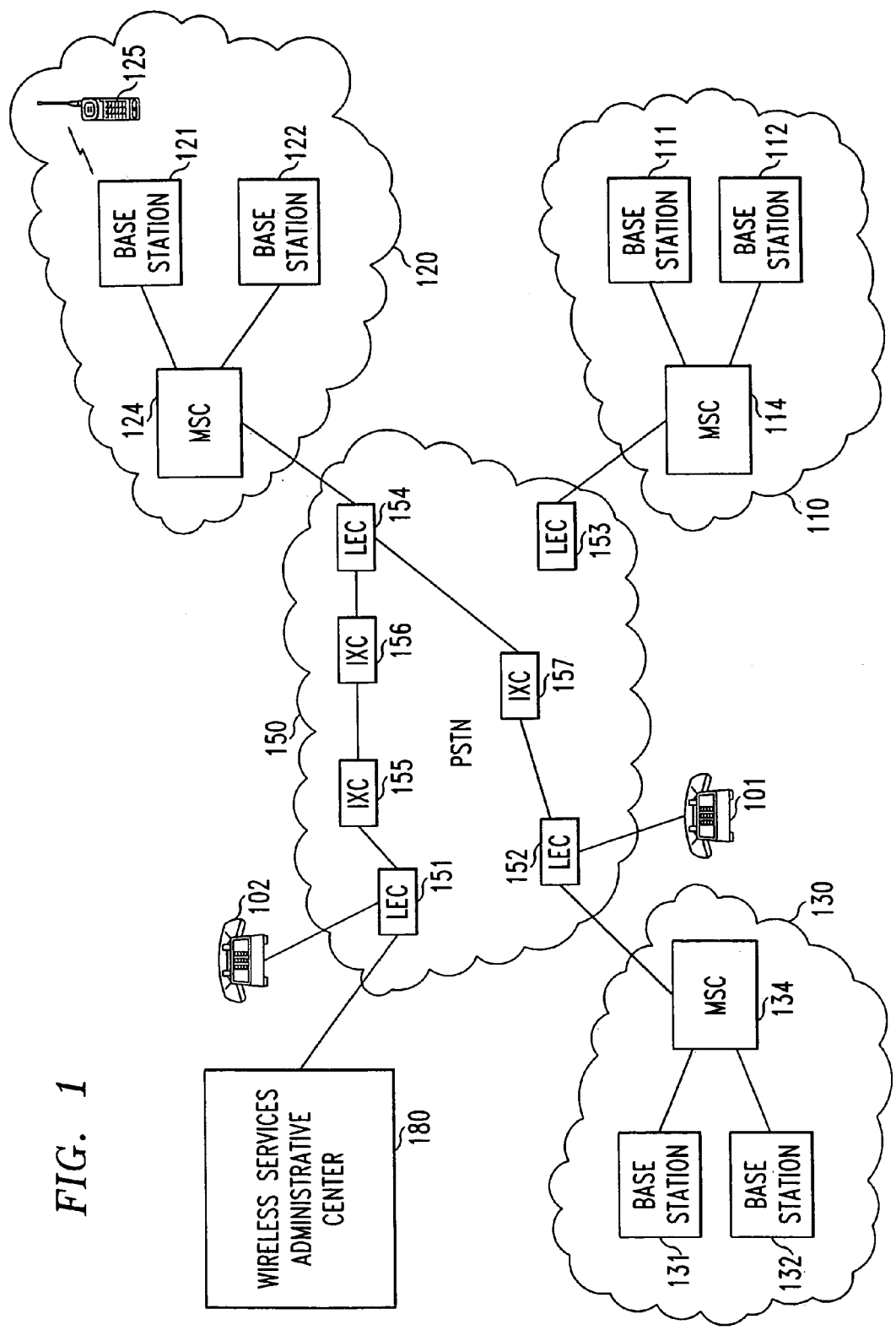
FIG. 1 illustrates a known telecommunication configuration in which the present invention may be employed.

Turning to FIG. 1 for descriptive purposes, it is initially presumed that subscriber A has purchased or leased mobile device 125. At the time that the phone is to be activated, the device may be within the wireless service provider footprint 120. An over-the-air activation process can then be initiated as normal. During the course of that activation process the user may desire to indicate a preference for a particular service or billing plan.

One such billing plan might be a special billing rate by which all calls either made by or received by the mobile device are charged the same rate wherever the device may be, that is, whether it is in the wireless service provider's footprint or outside of the wireless service provider's footprint. To provide such a service it may be important to know that the mobile device in question has the technical capability to perform the service in question. For example, in connection with the AT&T wireless network, to avail oneself of the special billing program referred to as Digital One Rate (DOR) it is appropriate that the wireless device have the capability of operating on multiple networks, that is both analog and digital networks. This is because the various regions in which the mobile device may attempt to operate may have only digital service or analog service, not both. Thus, the device must have the capability of operating in either environment. As a consequence, this is a device capability limitation for registering for a given service.

To facilitate the registration process the wireless services administrative center may have a device capabilities database arranged by electronic serial numbers (ESNs) associated with each of the devices which are sold or leased or expected to be sold or leased by the wireless service provider. This ESN driven database can store information about the technical capabilities of each mobile device, such as whether the device is a multi-network phone (MNP) or other types of characteristics as will be described below.

If it is determined in the initial stages of the registration attempt that the mobile communication device 125 is capable of operating the desired service, a second question arises: is the service geographically limited in some respect. If so, then does the mobile device or its subscriber satisfy the geographic limitation so as to be permitted to register for the service.

This might be better explained from the perspective of the Digital One Rate service. It has been determined by analysis that a vast majority of mobile calls are made by a user from the same footprint which covers the user's "home" location whether that home be a business or a residence. Put another way, typically the user makes more calls from its home service provider than it does while roaming into the footprints of other service providers where the primary service provider is not located. Thus, in a service where a party is being charged a single rate regardless of where the calls are initiated or received, it is desirable that there be a high probability that the calls will be initiated or received while the mobile device is within the footprint of the wireless service provider offering this special billing rate. To increase that probability, a geographic filter can be utilized in determining whether the service should be extended to a given subscriber. To accomplish this another database can be provided, namely an eligibility area database. This database has the capability of identifying which billing rates are available in which geographic areas. Then, during the registration process the subscriber is asked to indicate the subscriber home location. That location is cross-checked against the eligibility area database to ascertain whether the subscriber's home location is eligible for the service or billing rate plan requested by the subscriber. If it is, then the wireless service provider may register the subscriber for the given service or billing rate plan. If not, (for example, the subscriber's home location is in service area 110 while the service provider has footprints 120 and 130) the subscriber can be so notified and, if the database contains appropriate information, the subscriber can be advised as to an alternative billing plan for which he or she is eligible based on the home location and/or the equipment capabilities.

Thus, the present invention provides a technique for "filtering" service requests in accordance with both equipment capabilities and geographic constraints. A further detailed description of how to achieve this filtering will now be provided.

Figures 2, 3:
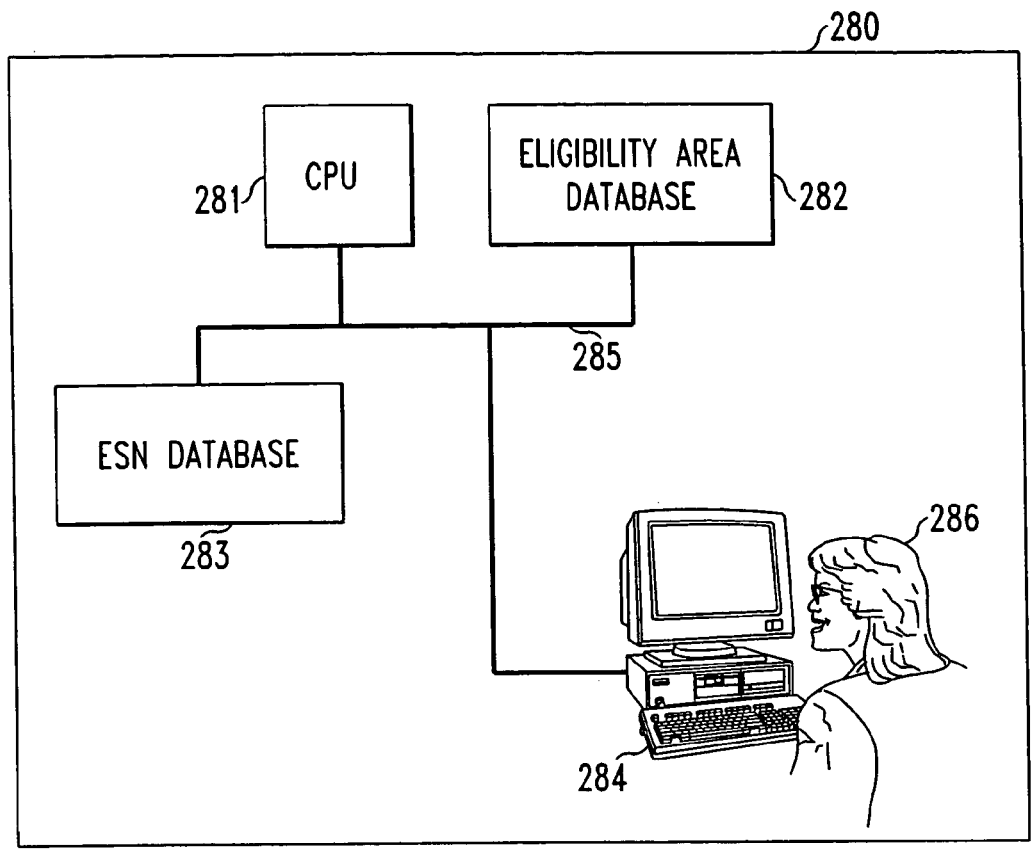
FIG. 2 illustrates, in block diagram form, a wireless services administrative center in connection with an embodiment of the present invention.
FIG. 3 illustrates, in block diagram form, an arrangement of a component of FIG. 2.

As indicated above, the present invention can be implemented in accordance with processing performed at the wireless services administrative center 180 of FIG. 1. An example of one embodiment of such an administrative center in accordance with an embodiment of the present invention is illustrated in FIG. 2. This administrative center 280 can include a local area network 285 connecting a CPU 281, an eligibility area database 282, an electronic serial number (ESN) database 283 and a registration terminal 284 which can be operated by a representative 286 of the wireless service provider or some administrative group providing registration services on behalf of the wireless service provider. Device 284 can be a personal computer having display and data entry capabilities.

At the time of registration for a service, the mobile subscriber can provide information to the administrative center including an identification of the mobile communication device itself. This can be done at the time of activation in which case the subscriber would need to use a device other than the mobile device in question to contact the center. Alternatively, if the device has previously been activated then it can be used in the registration process. One example of an identifier is the electronic serial number of the device. While that identifier is utilized in connection with the described embodiment, other identifiers which are considered unique identifiers for a given mobile communication device may be employed. Upon receipt of this device identifier, the representative 286 may enter this identifier into a registration form provided on the display of device 284. These displays can be provided in a known fashion using a known graphical user interface. The forms can be supplied to the registration terminal from a registration database (not shown). The CPU operates to execute functionality defined by stored programs where the memory storing those programs is not shown. Upon entry of the unique identifier, here the ESN of the mobile device, a database access operation is performed via the local area network so as to retrieve information from the ESN database 283. Examples of the types of information which maybe contained in the ESN database 283 are illustrated in FIG. 3, which shows a tabular representation of the types of information stored in that database. This format is shown for ease of presentation. Of course, the information could be stored in alternative formats if it is so desired. For example, a given mobile communication device may have an electronic serial number, 3831. It also may be identified by its make and model number, 3832 and 3833 respectively. The device may have some browser capabilities for interacting with a data network. This information can be indicated as shown at 3834. The information can be as simple as indicating that a browser is included. Alternatively, additional details could be provided as to the particular browser which is available on the given mobile communication device. Another type of information that may be provided in the ESN database is whether the communication device is capable of over-the-air activation as indicated at entry 3835. Yet another capability is whether the mobile device is a multi-network phone (MNP) entry 3836. Other device capabilities such as mode and band may also be indicated in the ESN database.

Once the representative 286 receives the ESN from the user or subscriber and accesses the ESN database, the registration system can automatically populate appropriate fields in the registration form appearing on the representative's display 284. At that time the representative can determine whether the communication device which seeks to register for a given service has the device capabilities necessary to access the requested service. For example, in the digital one rate application described above, it is appropriate to require that the communication device be capable of operating on multiple networks. Thus, the information with regard to the MNP entry for a given ESN can be determinative as to whether a given attempted registration to the digital one rate device should be permitted.

If the registration is permitted, it may still be appropriate to apply some geographic filtering to determine whether, based on some location information, the service should be granted to the subscriber. In connection with this location filtering operation, the representative can request that the potential subscriber identify the subscriber's home location, such as, for example, by zip code. Once the location information is received, the representative can examine whether the identified geographic location falls within the footprint of the wireless service provider. This is done by accessing the eligibility area database 282 to determine whether the identified geographic location corresponding to the subscriber's home falls within the footprint of the wireless service provider. If it does, then the subscriber can be deemed to be eligible for receiving a service.

Where both equipment capabilities and geographic limitations are considered as filters, a given subscriber may only be permitted to subscribe to a service if both criteria are satisfied. Furthermore, given the flexibility of storing alternative information in the ESN and eligibility area databases, it is possible that even where a given subscriber/mobile device does not satisfy the requirements for the requested service, the representative may be advised automatically by the system of alternative services for which the device/subscriber are qualified based on device capabilities and home location of the subscriber.

Examples of an eligibility area database content are illustrated in FIGS. 4A and 4B. While it is shown in tabular form, this does not require that the information be stored in this fashion. What is important is that the database provide some correlation between a location identifier, here shown as a zip code, although other location identifiers may be employed (e.g., town names, county names, states, or other geographic boundary delineations) and the various plans for which that area is eligible can also be indicated as shown at 4822 and 4823 of FIG. 4A.

In the tabular representation of FIG. 4B, the eligibility database may indicate the service available to a location, 4832, (e.g., OREA or CDPD) and a rate plan, 4833, associated with the location.

Thus, using the information of the databases of FIGS. 3 and 4, it is possible to filter a given service registration request and make a determination as to the appropriateness of granting that request. It should further be noted that while the databases are shown as distinct entities, it is not necessary that they be physically distinct, they could be provided in connection with the same server operation. Alternatively, while the present invention shows the databases co-located, it is possible that the databases could be located remotely from one another and/or the administrative center.

Figure 5:
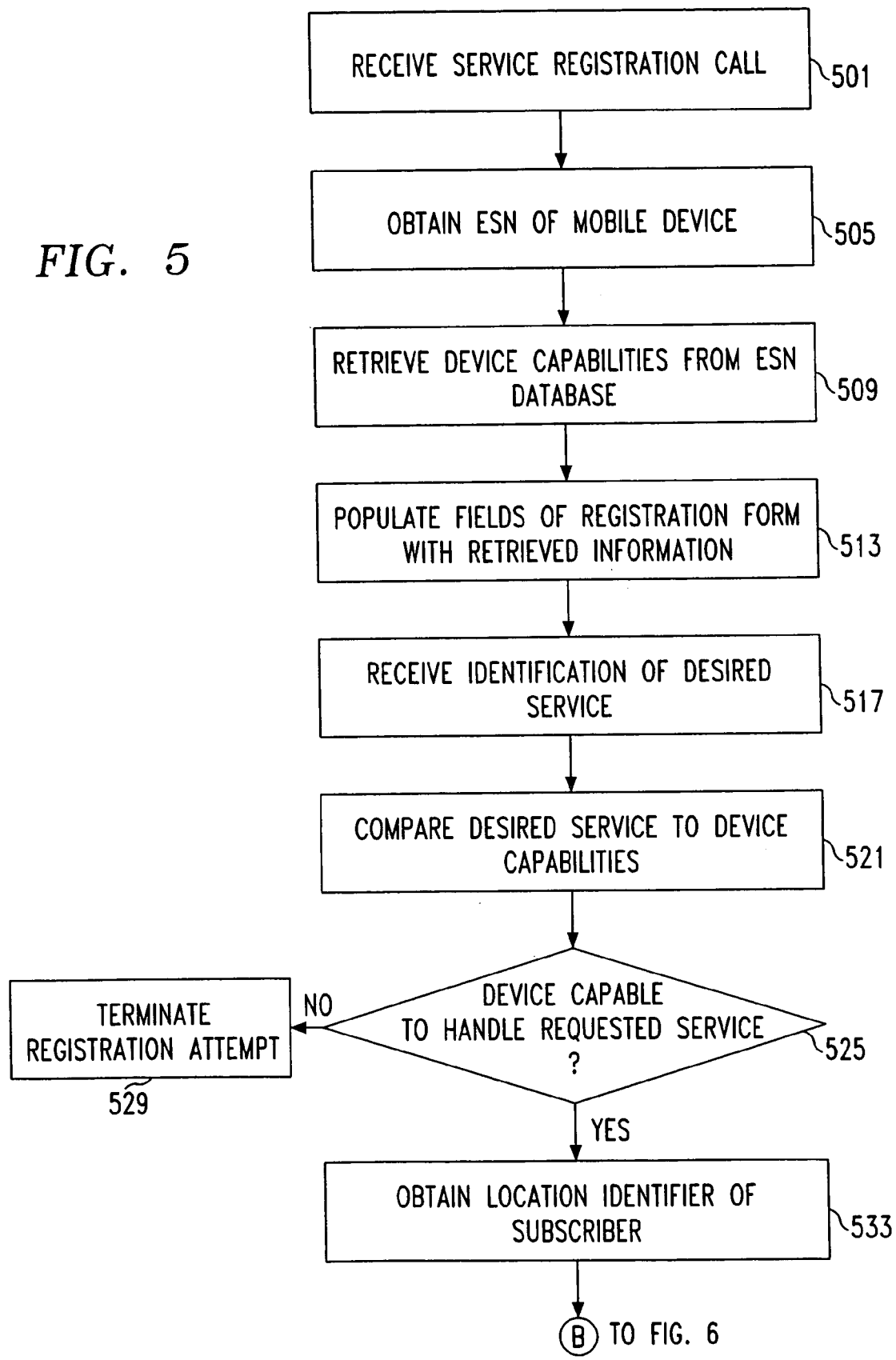
FIGS. 5 and 6 illustrate a process flow in accordance with an embodiment of the present invention.

Having described the elements of an arrangement for providing the registration technique of the present invention, as well as an overview of this registration operation, FIGS. 5 and 6 will now be described in connection with an embodiment of a process flow which would provide a registration operation in accordance with an embodiment of the present invention.

Initially, the services administrative center receives a service registration call, step 501. This service registration call can occur at initial activation of the wireless device or, alternatively the call could be received at a time subsequent to activation when the user decides to take advantage of a new service offering or to change service subscriptions. Having received the registration call, the administrative center obtains the ESN of the mobile device, step 505. This information could be conveyed automatically by the mobile device. Alternatively, this information could be conveyed over a voice communication from the operator of the mobile device to the administrative center. The representative can then retrieve device capabilities from the ESN database, step 509. This ESN database may have been populated, in part, with reference to information received from a national distribution center or from the equipment manufacturers themselves. The national distribution center would keep track of all ESNs either sold or leased or awaiting sale or lease by the wireless service provider. Once the device capabilities have been retrieved the fields of the registration form can be populated with retrieved information, step 513. The subscriber can then identify the service or services desired and that information would be received by the administrative center, step 517. Having received the device capabilities, the representative can determine whether the capabilities are consistent with the requested service, step 521. If the device is capable of handling the requested service as determined in the decision step, 525 then the representative can obtain a location identifier of the subscriber at step 533. If, however, the device is not capable of handling the requested service then the registration attempt may be terminated. A few alternative arrangements are worth noting. First, the representative can make the determination based on an examination of device capabilities as set forth in the populated registration form. Alternatively, the system itself may automatically make a determination whereby any attempt by the representative to register the subscriber for a given service will be denied if the ESN indicates that the equipment is incompatible with the service. That is, the system could prevent any override by the representative and could automatically block registration for the desired service. As a further aside, rather than terminating the registration attempt completely as in step 529, it is possible to terminate that given registration attempt and prompt the representative and/or subscriber to make another attempt at registration, this time to a service consistent with the equipment capabilities.

Figure 6:
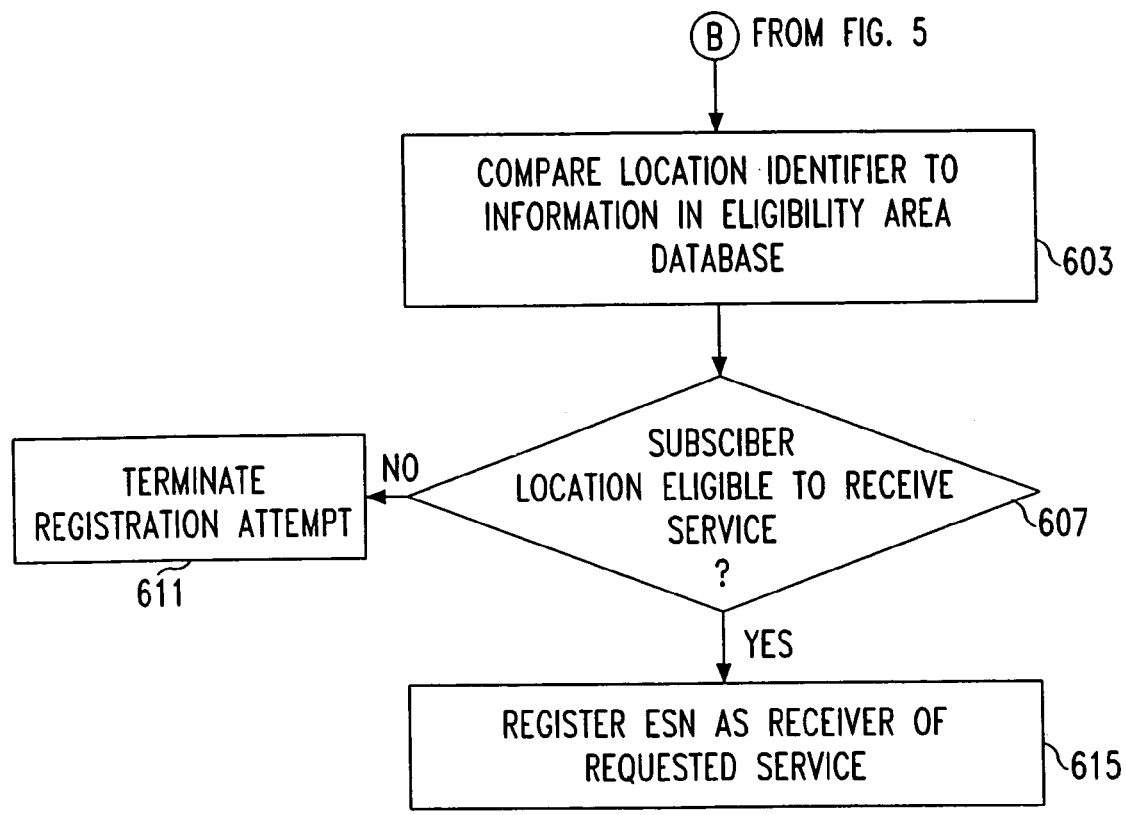

Continuing at point B on FIG. 6, once the location identifier information is received, it is compared to information in the eligibility area database, step 603. A decision step then determines whether the subscriber location is eligible to receive the service, step 607. If it is not eligible then the registration attempt may be terminated, step 611. Alternatively, if the location is eligible then the system may register the ESN as a receiver of the requested service, step 615.

Just as described above, the terminating operation may only terminate as to this particular service request and may in fact either prompt the user to request an alternative service or may await additional information from the user as to whether any alternative services are of interest. Additionally, the termination may occur either by information provided to the representative or may occur automatically. That is, access to the eligibility area database may produce a message to the representative indicating that the potential subscriber is not eligible for the service given the "home" location of the subscriber. The representative could then propose an alternative to the initially requested service thereby terminating the attempt to register for the first service. Alternatively, the system could automatically terminate the registration attempt such that the representative could not override the system's limitations so that if the representative attempts to register the subscriber for the requested service that attempt will be thwarted.

The present invention provides a technique for filtering access to services and/or billing plans related to a communication service. In accordance with the present invention, equipment capability information and geographic eligibility information can be maintained as criteria for determining whether a party attempting to subscribe with a given communication device should be permitted to subscribe to the given service or billing rate. This arrangement facilitates the registration process while assuring that only those parties which should be eligible for a given service or billing plan are in fact given access to that service and billing plan.

The invention claimed is:

1. A method comprising:

pursuant to a registration process for a potential subscriber to a wireless service, accessing filtering information to determine whether to permit the potential subscriber to receive the service, the filtering information relating to whether a mobile device associated with the potential subscriber is technically capable of receiving the service, and to whether, based on the potential subscriber's home location, the potential subscriber is eligible to receive the service;

if the mobile device is technically capable of receiving the service and the potential subscriber is eligible to receive the service based on the home location, registering the potential subscriber to receive the service; and if the mobile device is not technically capable of receiving the service, proposing an alternative service to the potential subscriber, wherein the alternative service is compatible with the mobile device.

2. The method of claim 1, wherein the mobile device is considered to be technically capable of receiving the service if the mobile device can operate on both analog and digital networks.

3. The method of claim 1, wherein the potential subscriber is considered to be eligible to receive the service if the home location is within a wireless service provider's footprint.

4. The method of claim 1, wherein the service involves a special billing rate whereby all calls made or received by the mobile device are charged at a same rate whether or not the mobile device is within a wireless service provider's footprint.

5. The method of claim 1, wherein the filtering information associates an electronic serial number of the mobile device with a definition of a technical capability of the mobile device.

6. The method of claim 1, further comprising:

if the mobile device is not technically capable of receiving the service, attempting to register the mobile device for a different service consistent with its technical capabilities.

7. A system comprising:

a capabilities database including identifiers of mobile devices associated with subscribers to wireless services, wherein the capabilities database relates, via their respective identifiers, the mobile devices to technical capabilities thereof;

an eligibility database including location identifiers correlated with wireless services provided for areas respectively associated with the location identifiers; and a processor coupled to the capabilities database and the eligibility database to access the capabilities database and the eligibility database pursuant to a registration process for a potential subscriber to a given wireless service, to determine whether to permit the potential subscriber to receive the given wireless service, the registration process to further propose an alternative service to the potential subscriber if the given wireless service is incompatible with a mobile device associated with the potential subscriber.

8. The system of claim 7, wherein the capabilities database describes whether a mobile device is a multi-network-capable device.

9. The system of claim 7, wherein a location identifier is associated with a footprint of a wireless service provider.

10. The system of claim 9, wherein the given wireless service involves a special billing rate whereby all calls made or received by the mobile device are charged at a same rate whether or not the mobile device is within the wireless service provider's footprint.

* * * * *